(12) United States Patent
Tan

(10) Patent No.: US 12,186,889 B2
(45) Date of Patent: Jan. 7, 2025

(54) SAFETY SWITCH DEVICE

(71) Applicant: FANUC CORPORATION, Yamanashi (JP)

(72) Inventor: Qin Chen Tan, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 53 days.

(21) Appl. No.: 17/914,919

(22) PCT Filed: Apr. 28, 2020

(86) PCT No.: PCT/JP2020/018071
§ 371 (c)(1),
(2) Date: Sep. 27, 2022

(87) PCT Pub. No.: WO2021/220386
PCT Pub. Date: Nov. 4, 2021

(65) Prior Publication Data
US 2023/0114531 A1    Apr. 13, 2023

(51) Int. Cl.
*B25J 13/02* (2006.01)
*B25J 19/06* (2006.01)

(52) U.S. Cl.
CPC ............. *B25J 13/02* (2013.01); *B25J 19/06* (2013.01)

(58) Field of Classification Search
CPC .................................. B25J 13/02; B25J 19/06
See application file for complete search history.

(56) References Cited

U.S. PATENT DOCUMENTS

2016/0114478 A1* 4/2016 Wu .................... B25J 13/06
901/3
2016/0297067 A1* 10/2016 Kogan .................. B25J 13/06
(Continued)

FOREIGN PATENT DOCUMENTS

CN        2551515 Y        5/2003
CN       105373119 A  *    3/2016
(Continued)

OTHER PUBLICATIONS

USPTO Machine Translation (retrieved from FIT database) of the Description of JP 2014033316 A, Taketsuna, Feb. 20, 2014. (Year: 2024).*

(Continued)

*Primary Examiner* — Daniel D Yabut
(74) *Attorney, Agent, or Firm* — Maier & Maier, PLLC

(57) ABSTRACT

A safety switch device including a device main body, a movable portion movable in a moving direction with respect to the device main body, and a holding portion configured to hold the movable portion at a position in the moving direction. The device main body includes a main-body-side holding portion, the movable portion includes a movable-portion-side holding portion provided so as to be opposite to the main-body-side holding portion in the moving direction, the holding portion includes a rack gear provided in one of the device main body and the movable portion, an engaging tooth member provided in the other of the device main body and the movable portion so as to be movable in a direction intersecting the moving direction, and an springy member that urges the engaging tooth member in a direction in which the engaging tooth member meshes with the rack gear.

9 Claims, 15 Drawing Sheets

(56) References Cited

U.S. PATENT DOCUMENTS

| | | | |
|---|---|---|---|
| 2018/0143614 A1 | 5/2018 | Aizawa et al. | |
| 2018/0169282 A1* | 6/2018 | Kusano | C01B 13/11 |
| 2019/0299404 A1 | 10/2019 | Muneto et al. | |
| 2020/0041067 A1* | 2/2020 | Chen | F16M 13/00 |
| 2020/0338748 A1* | 10/2020 | Tanaka | B25J 13/081 |
| 2022/0388177 A1* | 12/2022 | Nakajima | A45F 5/10 |

FOREIGN PATENT DOCUMENTS

| | | | | |
|---|---|---|---|---|
| DE | 102015206578 B3 * | 8/2016 | | B25J 13/02 |
| EP | 3456489 A1 | 3/2019 | | |
| EP | 3484133 A1 * | 5/2019 | | B60R 11/02 |
| JP | 2011178180 A | 9/2011 | | |
| JP | 2014033316 A | 2/2014 | | |
| JP | 2014-220474 A | 11/2014 | | |
| JP | 2017-202550 A | 11/2017 | | |
| JP | 2018-083259 A | 5/2018 | | |
| JP | 2019091985 A * | 6/2019 | | B60R 11/02 |
| JP | 2020-019103 A | 2/2020 | | |
| KR | 10-2012-0075711 A | 7/2012 | | |
| KR | 10-2018-0094254 A | 8/2018 | | |
| WO | 2017/195788 A1 | 11/2017 | | |

OTHER PUBLICATIONS

International Search Report mailed Jul. 28, 2020 in corresponding International Application No. PCT/JP2020/018071; 5 pages (w/ partial Machine translation).

* cited by examiner

SAFETY SWITCH DEVICE

CROSS-REFERENCE TO RELATED APPLICATIONS

This application is a national phase of International Patent Application No. PCT/JP2020/018071, filed on Apr. 28, 2020, the entire contents of which is incorporated herein by reference.

FIELD

The disclosure relates generally to a safety switch device.

BACKGROUND

There is a known robot operation unit that is detachably attached to a commercially available portable terminal, thereby constituting a robot teaching device (for example, see Japanese Unexamined Patent Application, Publication No. 2017-202550).

This robot operation unit includes an operation unit body including an emergency stop button etc. and an attachment for attaching the operation unit body to a portable terminal.

DETAILED DESCRIPTION OF THE EMBODIMENTS

In order to attach an operation unit body to portable terminals having different sizes, an attachment is provided so as to be movable in the width direction of the portable terminals with respect to the operation unit body, and is capable of holding the portable terminal between the attachment and the operation unit body by means of a resilient force of a coil spring.

In this robot operation unit, the coil spring is elastically deformed by a small amount in a case in which the width dimension of the held portable terminal is small, and the coil spring is elastically deformed by a large amount in a case in which the width dimension of the portable terminal is large.

In other words, portable terminals having different width dimensions are held with different holding forces, and thus, there is a possibility that, in particular, a portable terminal having a small width dimension may fall off due to insufficient holding force. Therefore, it is preferable that the attached state can be stably maintained even when the width dimensions of portable terminals are significantly different.

An aspect derived from the following disclosure is a safety switch device including a device main body; a movable portion that is provided so as to be movable in a prescribed moving direction with respect to the device main body; and a holding portion configured to hold the movable portion at a desired position in the moving direction with respect to the device main body. The device main body includes a main-body-side holding portion with which one side of a portable terminal is brought into close contact, the movable portion includes a movable-portion-side holding portion that is provided so as to be opposite to the main-body-side holding portion in the moving direction and with which an other side of the portable terminal is brought into close contact, the holding portion includes a rack gear that is provided in one of the device main body and the movable portion along the moving direction, an engaging tooth member that is provided in the other of the device main body and the movable portion and that is supported so as to be movable in a direction intersecting the moving direction, and an springy member that urges the engaging tooth member in a direction in which the engaging tooth member meshes with the rack gear, and the rack gear and the engaging tooth member, in a meshed state, have a shape that the rack gear and the engaging tooth member are engaged with each other so as to be movable in a direction in which a distance between the main-body-side holding portion and the movable-portion-side holding portion is narrowed and so as not to be movable in an opposite direction.

A safety switch device 1 according to an embodiment of the present disclosure will be described below with reference to the drawings.

Figure 1:
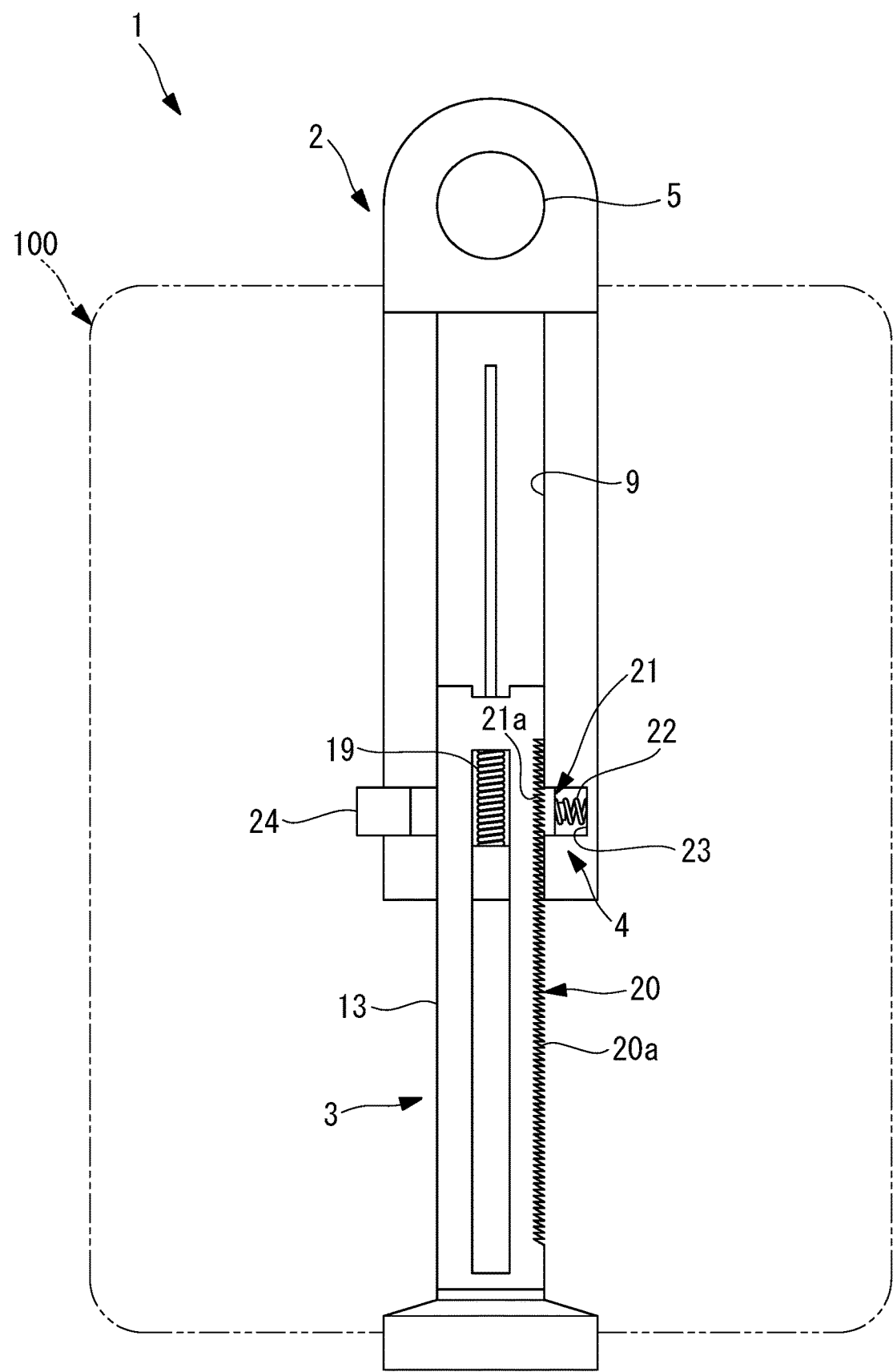
FIG. 1 is a front view showing a safety switch device according to an embodiment of the present disclosure.
Figure 2:
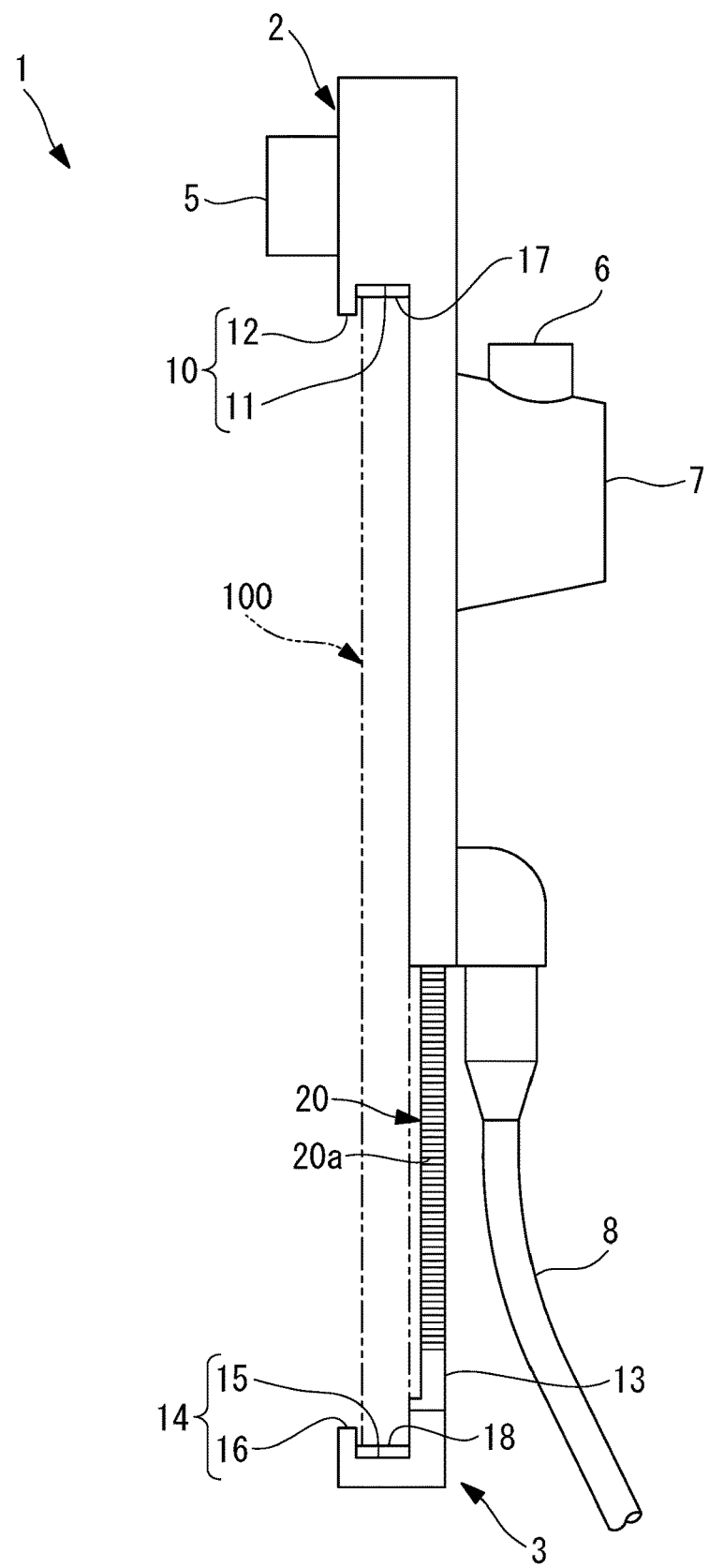
FIG. 2 is a side view of the safety switch device in FIG. 1.
Figure 3:
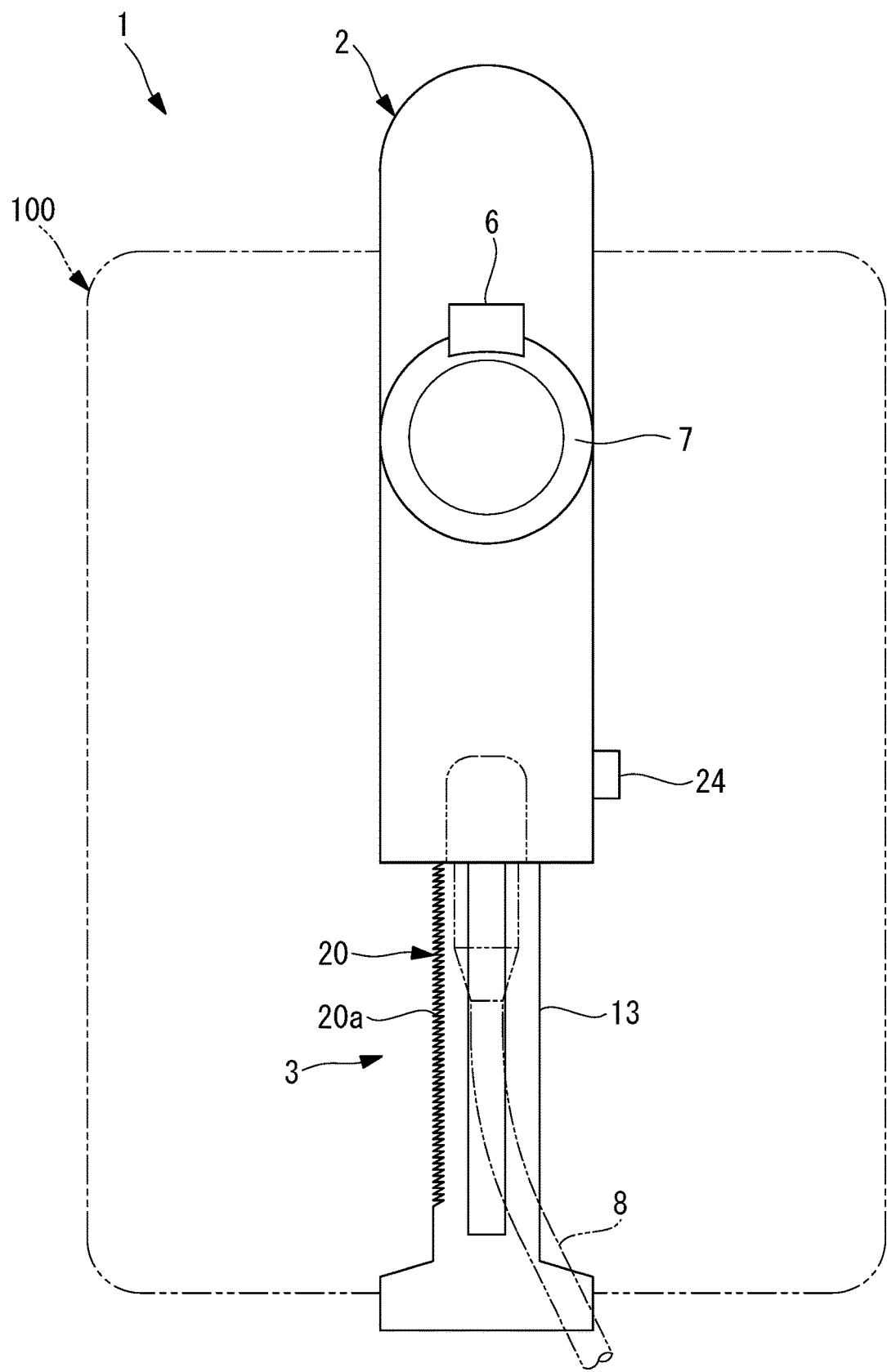
FIG. 3 is a rear view of the safety switch device in FIG. 1.

As shown in FIGS. 1 to 3, the safety switch device 1 according to this embodiment includes a device main body 2 having a longitudinal direction and a slider (movable portion) 3 that is attached to the device main body 2 so as to be movable along the longitudinal direction (a prescribed moving direction). In addition, the safety switch device 1 includes a holding portion 4 that holds the device main body 2 and the slider 3 in a state of being fixed to each other at a desired position in the moving direction.

The device main body 2 is provided with an emergency stop button 5 on the front surface side and is provided with a deadman switch 6 and a handle (grip portion) 7 on the rear surface side. The emergency stop button 5 is disposed at a position close to one end of the device main body 2 in the longitudinal direction. A cable 8 for connecting the emergency stop button 5 and the deadman switch 6 to a control device (not shown) is attached to the other end of the device main body 2 in the longitudinal direction.

The handle 7 is formed in a truncated cone shape protruding from the rear surface of the device main body 2 in a direction orthogonal to the rear surface. The deadman switch 6 is disposed at a position to protrude from an outer circumferential surface of the handle 7 toward the one end of the device main body 2 in the longitudinal direction.

Figure 4:
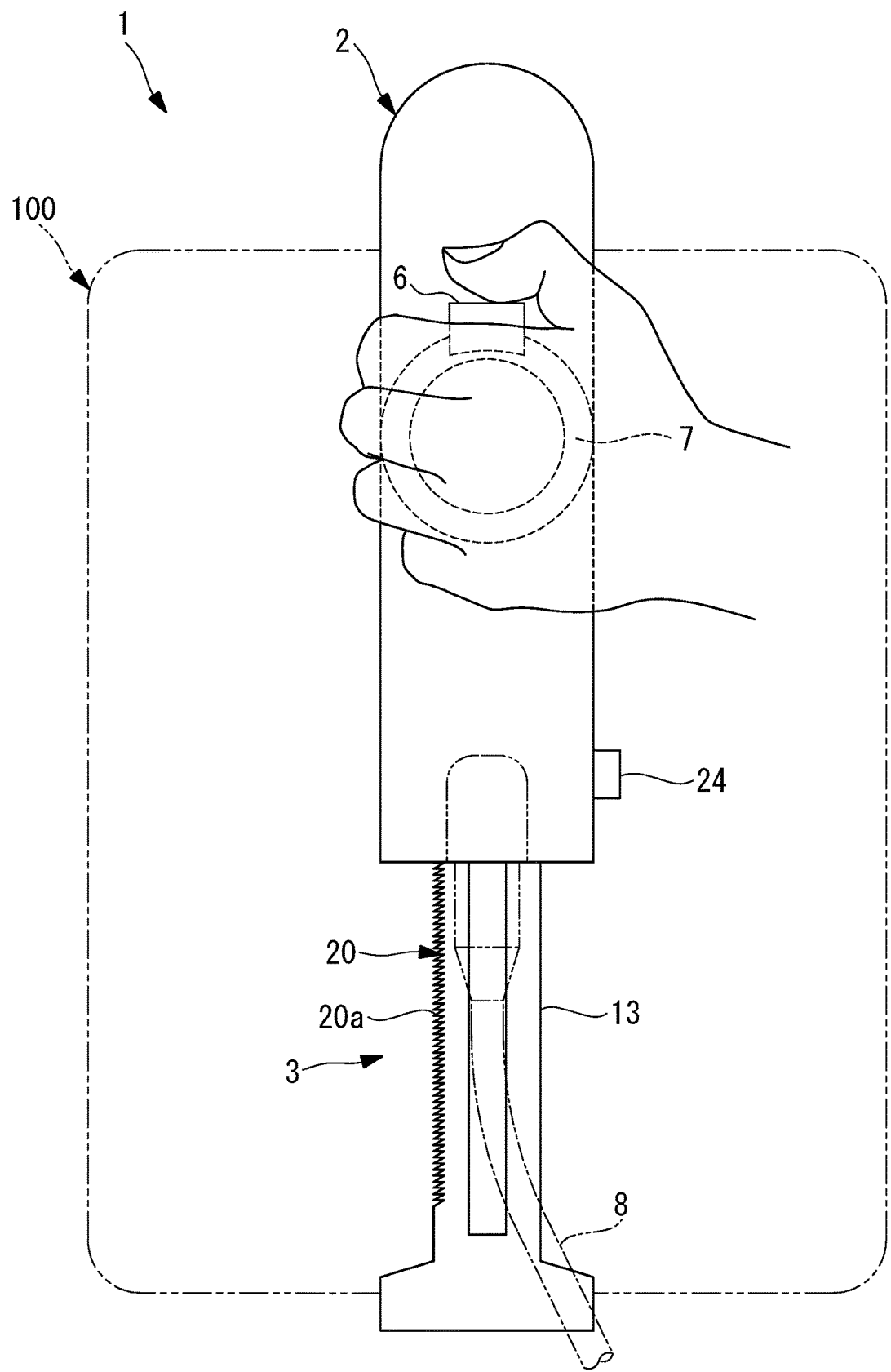
FIG. 4 is a rear view showing a state in which a handle of the safety switch device in FIG. 1 is gripped by an operator.

As shown in FIG. 4, the deadman switch 6 is disposed at a position where, when an operator grips the handle 7 with the right hand or left hand, the index finger or thumb of the hand gripping the handle 7 can be exactly placed. When the operator pushes the deadman switch 6 with the index finger or thumb of the hand gripping the handle 7, the operation of a portable terminal 100 is permitted, and when the deadman switch 6 is released, an emergency stop state is achieved.

As shown in FIGS. 1 and 2, the device main body 2 has, on the front surface side thereof, a groove 9 extending in the longitudinal direction and a first holding portion (main-body-side holding portion) 10 that is disposed at one end of the groove 9. The first holding portion 10 includes an abutting surface 11 that extends in a direction orthogonal to the longitudinal direction and against which one end edge of the portable terminal 100 is abutted, and a protruding portion 12 for holding the one end edge of the portable terminal 100 to prevent removal thereof from the abutting surface 11.

The slider 3 includes a strip-shaped sliding portion 13 that is accommodated in the groove 9 from the other end of the groove 9 into the groove 9 so as to be movable in the longitudinal direction, and a second holding portion (movable-portion-side holding portion) 14 that is provided at one end of the sliding portion 13. The second holding portion 14 includes an abutting surface 15 that extends in a direction orthogonal to the longitudinal direction and against which the other end edge of the portable terminal 100 is abutted, and a protruding portion 16 for holding the other end edge of the portable terminal 100 to prevent removal thereof from the abutting surface 15.

As shown in FIGS. 1 and 2, the first holding portion 10 and the second holding portion 14 are arranged at positions opposed to each other in the longitudinal direction of the device main body 2. In addition, the abutting surface 11 of the first holding portion 10 and the abutting surface 15 of the second holding portion 14 are respectively provided with elastically deformable cushions (elastic bodies) 17, 18.

As shown in FIG. 1, a coil spring (urging member) 19 for urging the first holding portion 10 and the second holding portion 14 in an approaching direction to each other is disposed between the slider 3 and the device main body 2.

As shown in FIG. 1, the holding portion 4 includes a rack gear 20 that is provided in the slider 3, an engaging tooth member 21 that is provided in the device main body 2 and that is capable of meshing with the rack gear 20, and a coil spring (springy member) 22 for urging, by means of the resilient force thereof, the engaging tooth member 21 to a position where the engaging tooth member 21 meshes with the rack gear 20.

Figure 5:
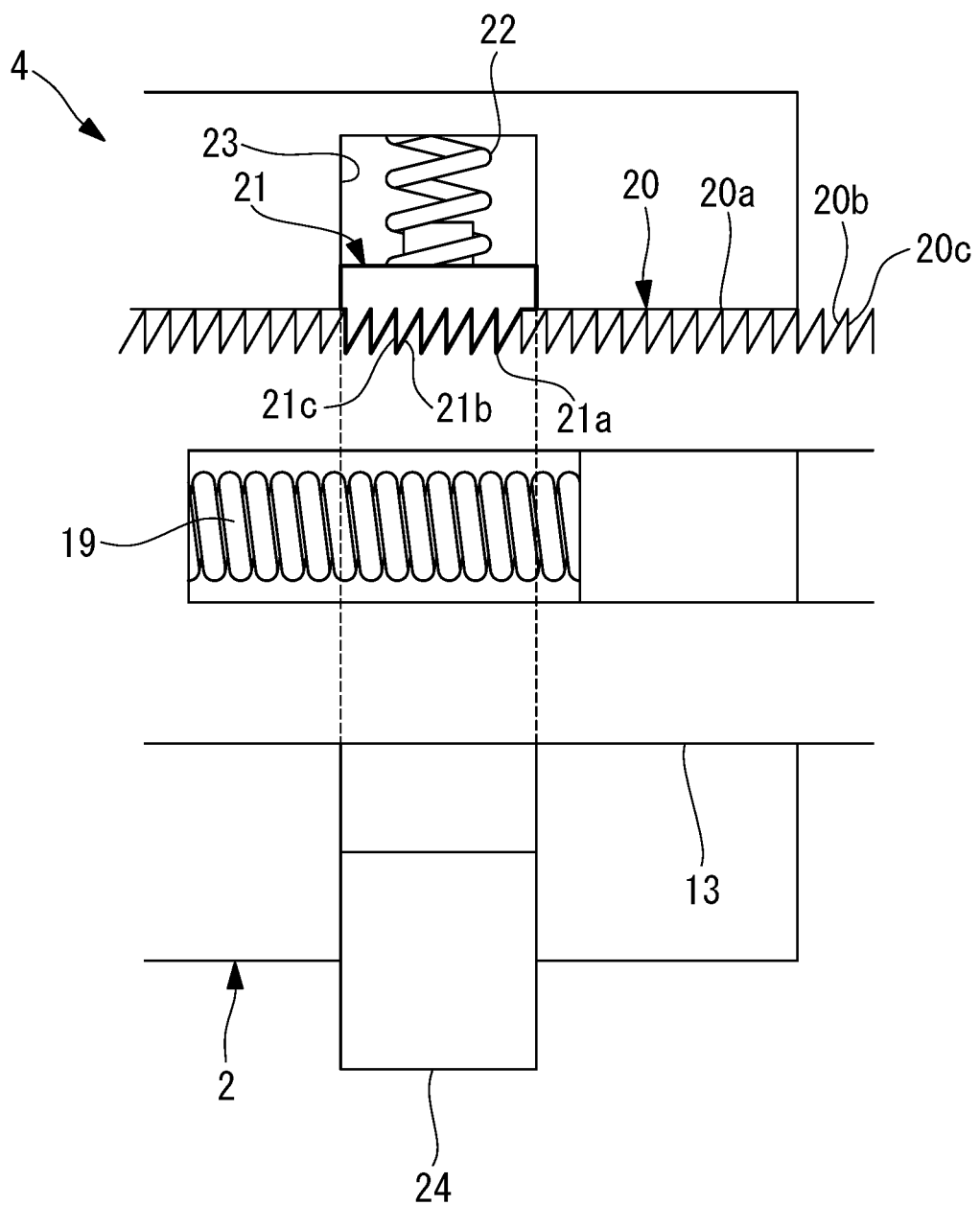
FIG. 5 is a partially enlarged view for explaining a holding portion of the safety switch device in FIG. 1.

Specifically, the rack gear 20 includes a plurality of teeth 20a arranged along a side surface of the sliding portion 13. As shown in FIG. 5, the teeth 20a of the rack gear 20 each have an inclined surface 20b that is disposed on a side opposite to the second holding portion 14 in the arrangement direction and a contact surface 20c that is disposed on the side of the second holding portion 14. The inclined surface 20b is inclined toward the second holding portion 14 as going outward in the width direction of the sliding portion 13. In addition, the contact surface 20c extends along the width direction of the sliding portion 13.

The individual teeth 20a of the rack gear 20 are continuously arranged in such a manner that the contact surface 20c is connected to the inclined surface 20b of another tooth 20a adjacent in the arrangement direction.

The engaging tooth member 21 includes teeth 21a having a shape complementary to a plurality of, for example, seven continuous teeth 20a in a portion of the rack gear 20 in the arrangement direction. With this configuration, when the engaging tooth member 21 meshes with the rack gear 20, the seven teeth 21a of the engaging tooth member 21 mesh with the seven teeth 20a of the rack gear 20 at the same time.

As shown in FIG. 5, the engaging tooth member 21 is accommodated in a groove 23 formed in the device main body 2 along a direction orthogonal to the longitudinal direction so as to be movable in the direction orthogonal to the longitudinal direction. In addition, a coil spring 22 is disposed between the engaging tooth member 21 and the device main body 2, and urges the teeth 21a of the engaging tooth member 21 in a direction in which the teeth 21a mesh with the teeth 20a of the rack gear 20.

Furthermore, in a state in which the teeth 21a of the engaging tooth member 21 mesh with the teeth 20a of the rack gear 20, one end of the engaging tooth member 21 is disposed at a position protruding from a side surface of the device main body 2. When the operator presses the one end of the engaging tooth member 21 in a direction in which the engaging tooth member 21 is retracted into the device main body 2, the engaging tooth member 21 moves against the resilient force of the coil spring 22 in the direction orthogonal to the longitudinal direction of the device main body 2, and the engagement between the engaging tooth member 21 and the rack gear 20 is released.

With this configuration, the one end of the engaging tooth member 21 protruding from the side surface of the device main body 2 functions as a release mechanism 24 for releasing the engagement.

In this embodiment, as shown in FIG. 4, the engaging tooth member 21 is disposed at a position distant from the deadman switch 6 extending from the handle 7 toward the one end of the device main body 2, in the vicinity of an end portion at the other end of the device main body 2.

The operation of the thus-configured safety switch device 1 according to this embodiment will be described below.

The safety switch device 1 according to this embodiment is used by being attached to the portable terminal 100.

Examples of the portable terminal 100 include a multi-functional mobile telephone terminal (smartphone), a tablet terminal, and the like. In an example shown in FIGS. 1 to 4, the safety switch device 1 is attached to the portable terminal 100 in such a manner that one end edge of the portable terminal 100 in the longitudinal direction is brought into close contact with the first holding portion 10, and the other end edge of the portable terminal 100 in the longitudinal direction is brought into close contact with the second holding portion 14, so that the portable terminal 100 is held between the first holding portion 10 and the second holding portion 14.

In this case, the portable terminal 100 is disposed between the first holding portion 10 and the second holding portion 14, and the slider 3 is pressed relative to the device main body 2 in a direction in which the first holding portion 10 and the second holding portion 14 are brought closer to each other. The coil spring 19 disposed between the device main body 2 and the slider 3 assists the movement of the slider 3 with respect to the device main body 2 in the direction in which the first holding portion 10 and the second holding portion 14 are brought closer to each other.

Figure 6:
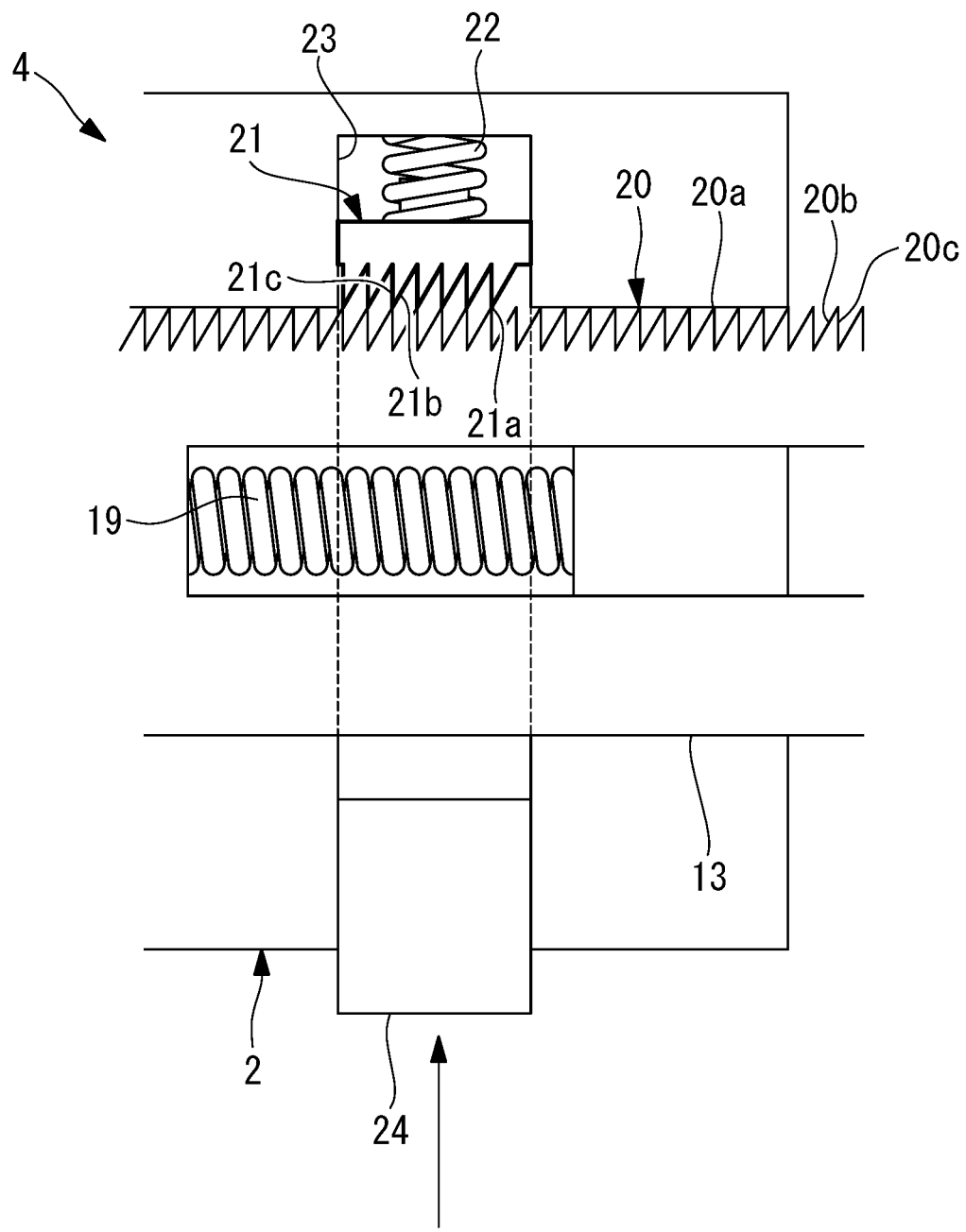
FIG. 6 is a partially enlarged view for explaining the operation of the holding portion in FIG. 5.

At this time, as shown in FIG. 6, the inclined surfaces 21b of the teeth 21a of the engaging tooth member 21 slide along the inclined surfaces 20b of the teeth 20a of the rack gear 20, and thus, the teeth 21a of the engaging tooth member 21 run on the teeth 20a of the rack gear 20. In this way, the engaging tooth member 21 moves against the resilient force of the coil spring 22 in a direction in which the engagement with the rack gear 20 is released, and the teeth 21a of the engaging tooth member 21 ride over the teeth 20a of the rack gear 20.

As a result, the slider 3 is moved with respect to the device main body 2 in the direction in which the first holding portion 10 and the second holding portion 14 are brought closer to each other by an amount corresponding to one tooth of the rack gear 20. Then, as a result of repeating this movement for the required number of teeth, it is possible to hold the portable terminal 100 between the first holding portion 10 and the second holding portion 14.

As described above, the adjustment of the distance between the first holding portion 10 and the second holding portion 14 is performed gradually in units of the pitch of the teeth 20a of the rack gear 20. When the first holding portion 10 and the second holding portion 14 are moved to positions closest to the longitudinal dimension of the portable terminal 100, the elastic bodies 17, 18 disposed on the abutting surface 11 of the first holding portion 10 and the abutting surface 15 of the second holding portion 14 are elastically deformed. In this way, it is possible to hold the portable terminal 100 between the first holding portion 10 and the second holding portion 14 without a gap.

In addition, when the rack gear 20 and the engaging tooth member 21 mesh with each other in a state in which the portable terminal 100 is held between the first holding portion 10 and the second holding portion 14 without a gap, the contact surfaces 20c of the teeth 20a of the rack gear 20 and the contact surfaces 21c of the teeth 21a of the engaging tooth member 21 abut against each other in the longitudinal direction of the device main body 2. With this configuration, even when an external force is applied, the distance between the first holding portion 10 and the second holding portion 14 is prevented from being widened, and the portable terminal 100 is maintained in the state of being held between the first holding portion 10 and the second holding portion 14.

In this case, with the safety switch device 1 according to this embodiment, as a result of the rack gear 20 and the engaging tooth member 21 meshing with each other in a state in which the portable terminal 100 is held between the first holding portion 10 and the second holding portion 14, the portable terminal 100 is maintained in the state of being held between the first holding portion 10 and the second holding portion 14. In other words, the portable terminal 100 is maintained in the held state by means of the resilient force of the coil spring 19 that is displaced in accordance with the amount of displacement of the engaging tooth member 21, instead of a conventional coil spring that is displaced in accordance with the amount of displacement of the slider 3. As a result, the holding force does not change according to the size of the portable terminal 100 to be held, and thus, there is an advantage in that it is possible to reliably maintain the attached state with respect to portable terminals 100 of various sizes arbitrarily selected by the operator.

In addition, in order to use the portable terminal 100 in a state in which the safety switch device 1 is attached thereto, the operator grips the handle 7 of the safety switch device 1, which is disposed on the rear surface of the portable terminal 100, with the left hand or right hand, and pushes the deadman switch 6 with the index finger or thumb of the hand gripping the handle 7. By doing so, the operator is allowed to operate the portable terminal 100 and can perform robot teaching work or the like.

In addition, when the emergency stop button 5 provided in the safety switch device 1 is pushed or the pushed state of the deadman switch 6 is released during the robot teaching work, the robot is brought into an emergency stop state.

In this case, with the safety switch device 1 according to this embodiment, the one end of the engaging tooth member 21 constituting the release mechanism 24 is disposed at a position separated from the hand of the operator gripping the handle 7. With this configuration, it is possible to prevent the one end of the engaging tooth member 21 from being mistakenly pushed by the hand gripping the handle 7 during the operation of the portable terminal 100.

In addition, because the engaging tooth member 21 is disposed in the vicinity of the end portion distant from the first holding portion 10 of the device main body 2, it is possible for the engagement between the rack gear 20 and the engaging tooth member 21 to start immediately after the slider 3 starts to be accommodated into the groove 9 of the device main body 2. With this configuration, there is an advantage in that it is possible to ensure a large adjustment range for the distance between the first holding portion 10 and the second holding portion 14.

In addition, with this embodiment, the engaging tooth member 21 includes the plurality of teeth 21a that mesh with the plurality of teeth 20a of the rack gear 20 at the same time; thus, it is possible to reduce the force applied to each of the teeth 21a, thereby maintaining the teeth 21a in a sound state. Furthermore, it is possible to maintain a stable engagement state even if one tooth 21a is lost.

In addition, in order to remove the safety switch device 1 from the portable terminal 100, as indicated by an arrow in FIG. 6, the one end of the engaging tooth member 21 constituting the release mechanism 24 is pressed in a direction in which the engaging tooth member 21 is pushed into the device main body 2, so that the engagement between the engaging tooth member 21 and the rack gear 20 is released. By doing so, it is possible to move the slider 3 with respect to the device main body 2 in a direction in which the distance between the first holding portion 10 and the second holding portion 14 is widened, and thus to remove the portable terminal 100.

Figure 7:
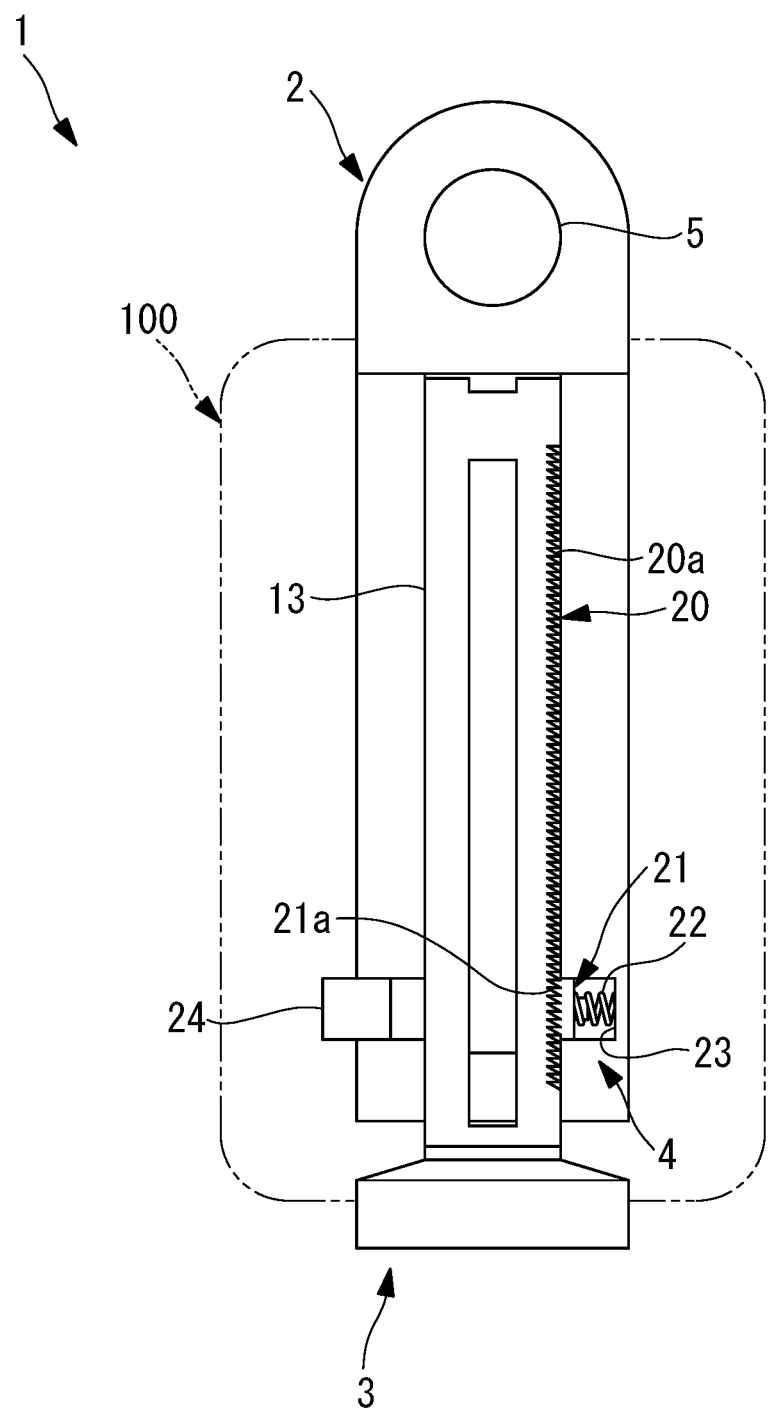
FIG. 7 is a front view showing a state in which a portable terminal having a size different from that in FIG. 1 is attached to the safety switch device in FIG. 1.

In addition, in a case in which the safety switch device 1 is attached to a portable terminal 100 having a different size, for example, as shown in FIG. 7, it is possible to hold the portable terminal 100 between the first holding portion 10 and the second holding portion 14 by moving the slider 3 with respect to the device main body 2.

Note that, although the case in which the engaging tooth member 21 has the seven teeth 21a has been illustrated as an example in this embodiment, alternatively, the number of teeth may be arbitrarily set. In addition, an engaging tooth member 21 having a single tooth 21a may be employed.

In addition, although the case in which the rack gear 20 is provided in the slider 3 and the engaging tooth member 21 is provided in the device main body 2 has been illustrated as an example in this embodiment, the configuration may be reversed.

In addition, although the case in which the engaging tooth member 21 is supported so as to be movable in a direction orthogonal to the moving direction of the slider 3 has been illustrated as an example in this embodiment, the engaging tooth member 21 may be supported so as to be movable in a direction intersecting the moving direction of the slider 3 at an arbitrary angle.

Figure 8:
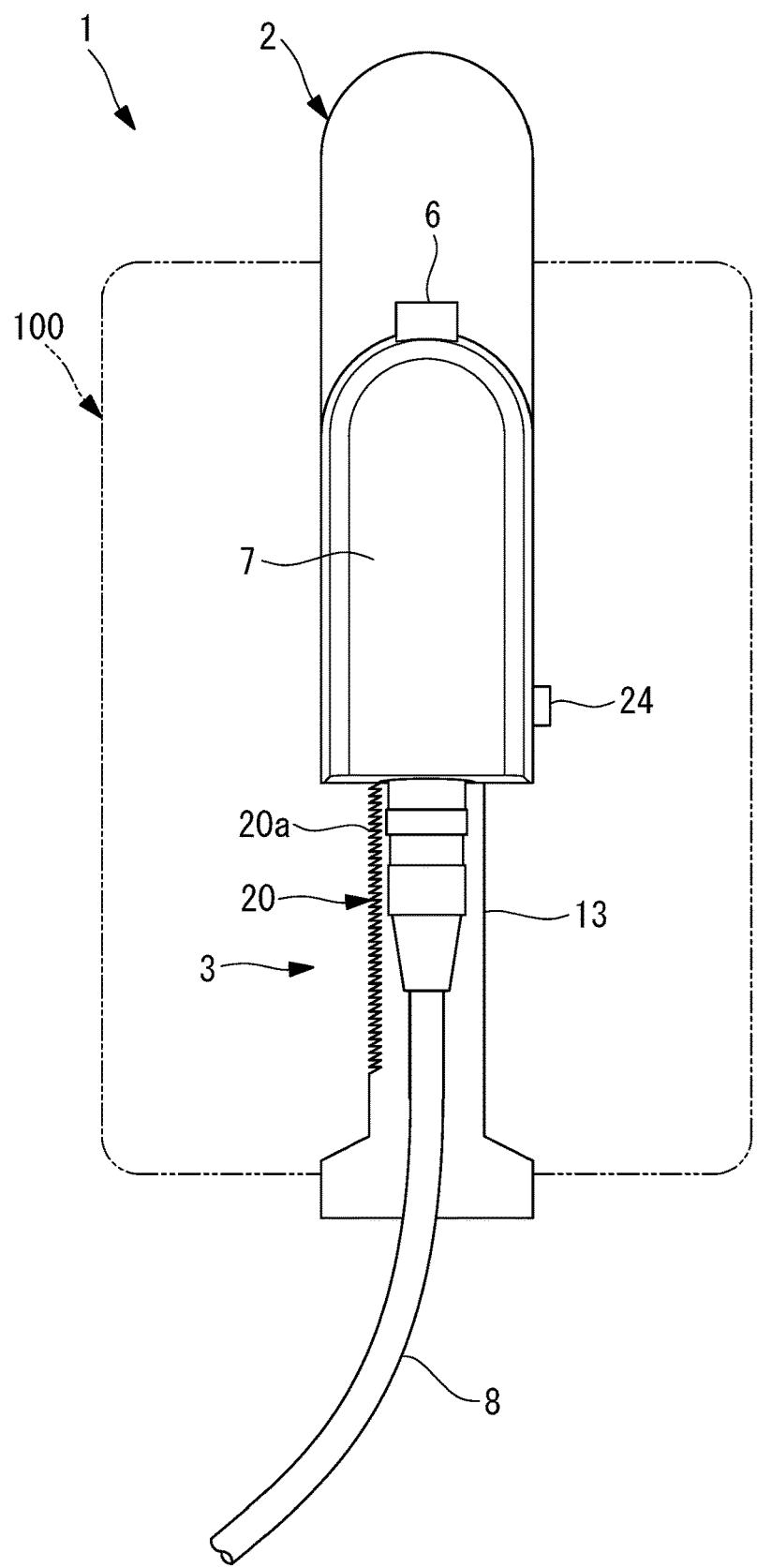
FIG. 8 is a rear view showing a modification in which the shape of the handle of the safety switch device in FIG. 1 is different.
Figure 9:
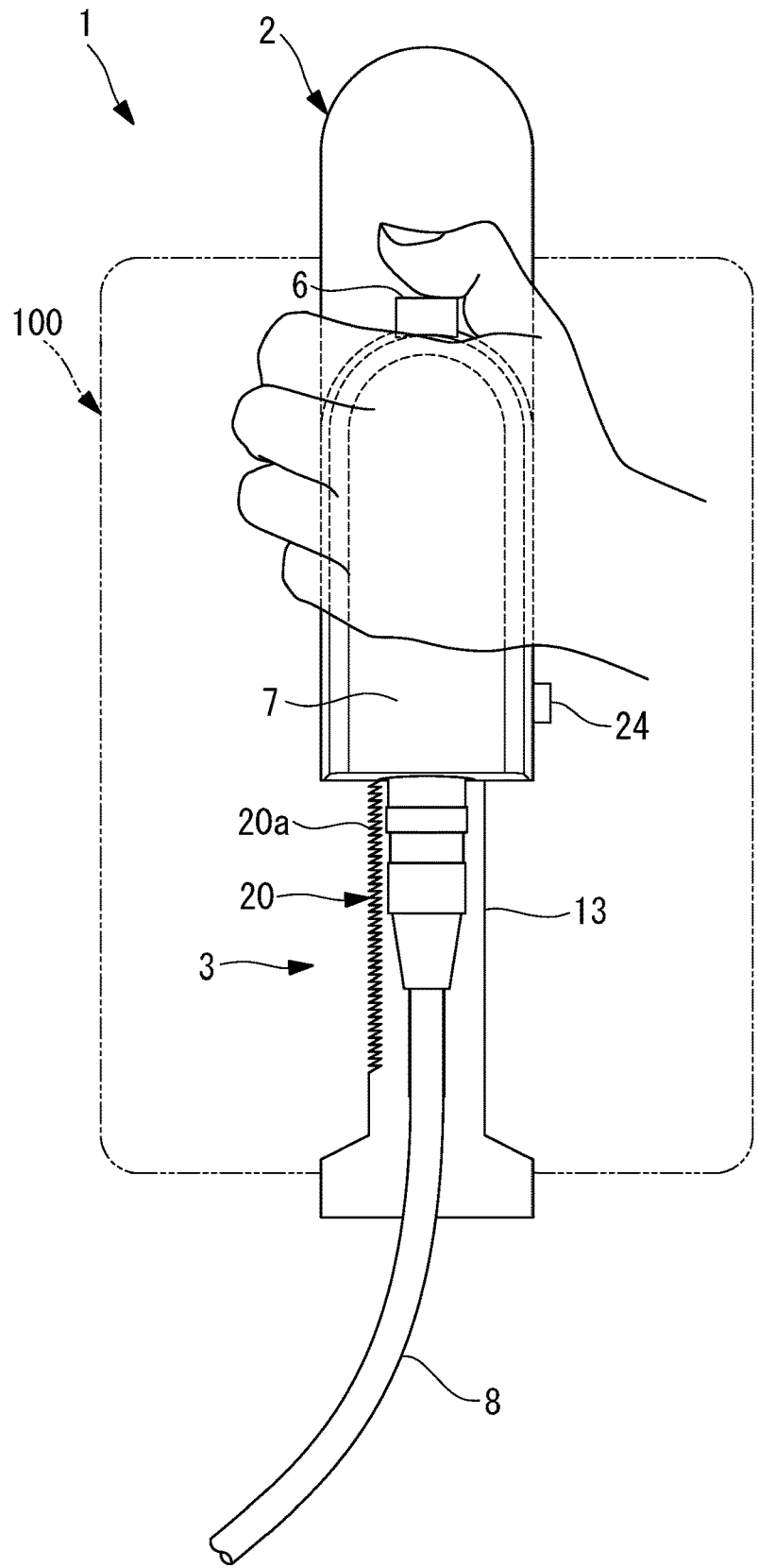
FIG. 9 is a rear view for explaining an aspect in which the handle is gripped while a deadman switch provided in the safety switch device in FIG. 8 is pushed with a thumb.
Figure 10:
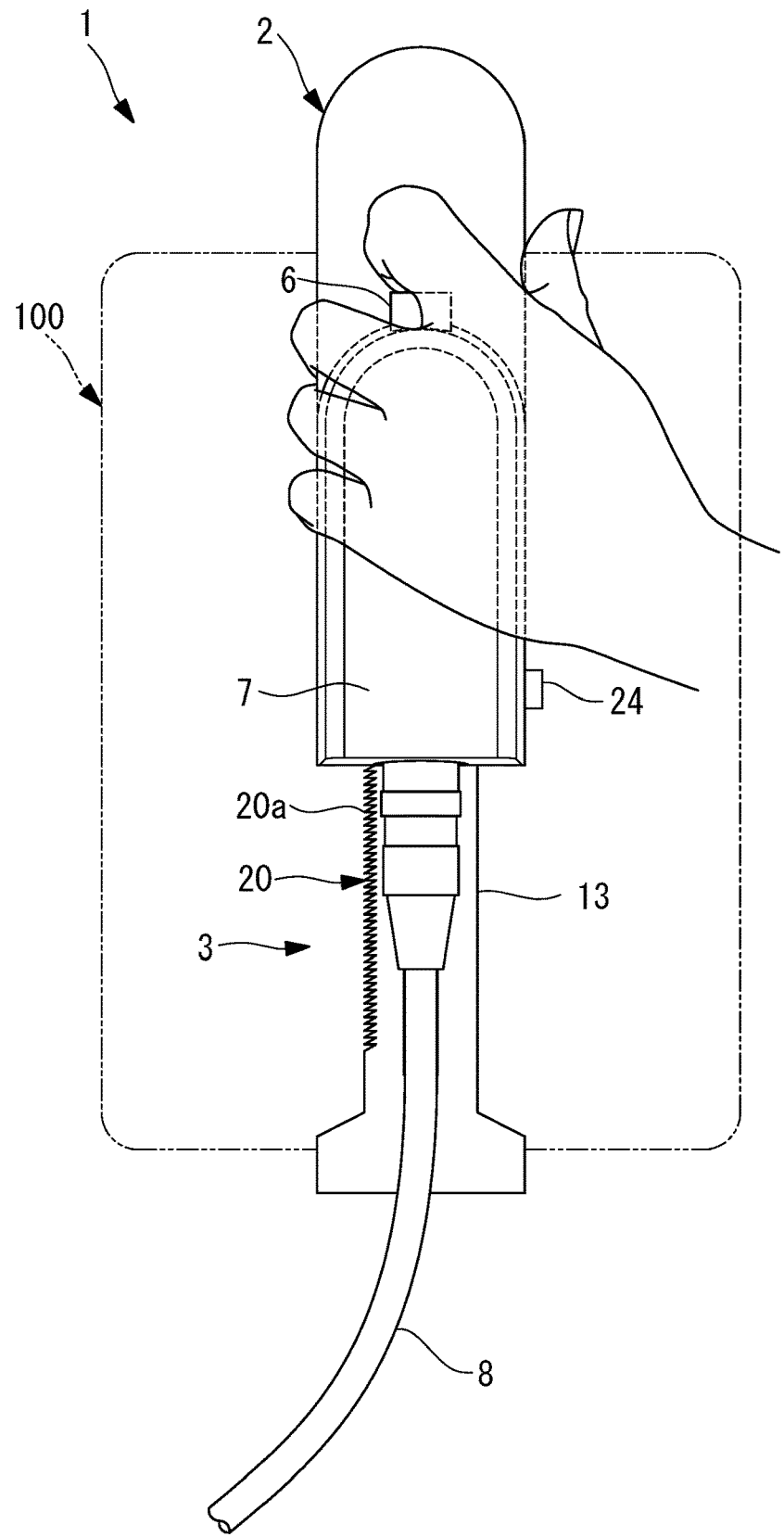
FIG. 10 is a rear view for explaining an aspect in which the handle is gripped while the deadman switch provided in the safety switch device in FIG. 8 is pushed with an index finger.

In addition, in this embodiment, the truncated cone shape protruding from the rear surface of the device main body 2 has been illustrated as an example of the handle 7 gripped by the operator; however, alternatively, the handle 7 may have a shape extending in the longitudinal direction on the rear surface of the device main body 2, as shown in FIG. 8. In this case, the handle 7 can be gripped as shown in FIGS. 9 and 10.

Figure 11:
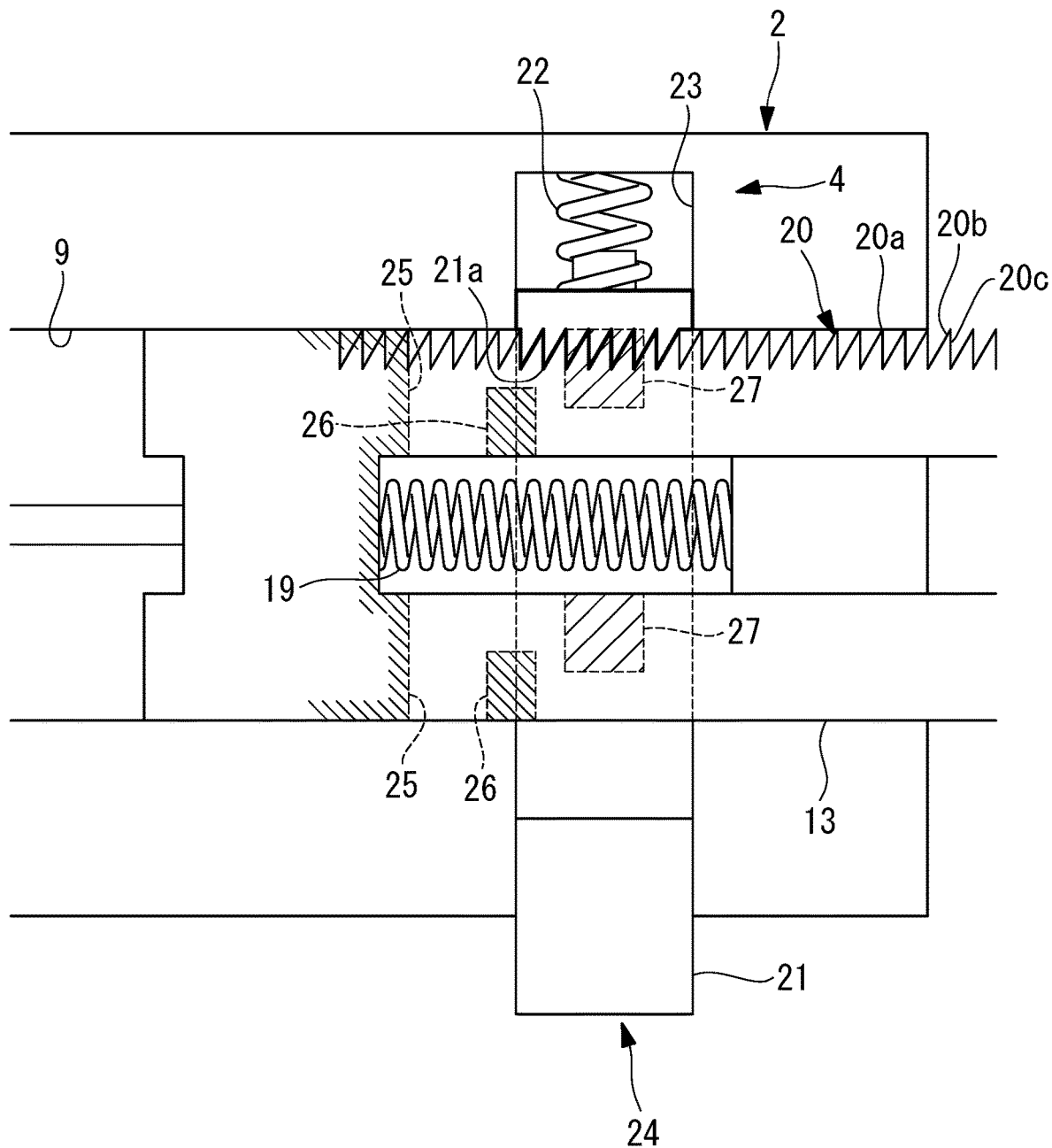
FIG. 11 is a partially enlarged view for explaining projections in a modification of the safety switch device in FIG. 1.

In addition, the slider 3 and the engaging tooth member 21 may be respectively provided with, at positions indicated by hatching in FIG. 11, projections (lock mechanism) 25 to 27 protruding in a direction orthogonal to the plane of the drawing of FIG. 11. The projections (first projection 25 and second projections 26) of the slider 3 and the projections (third projections 27) of the engaging tooth member 21 are arranged at substantially the same position in the direction orthogonal to the plane of the drawing of FIG. 11. The first projection 25 and the second projections 26 are arranged in the moving direction of the slider 3, at a distance slightly larger than the dimension of the third projection 27 along the moving direction.

Figure 12:
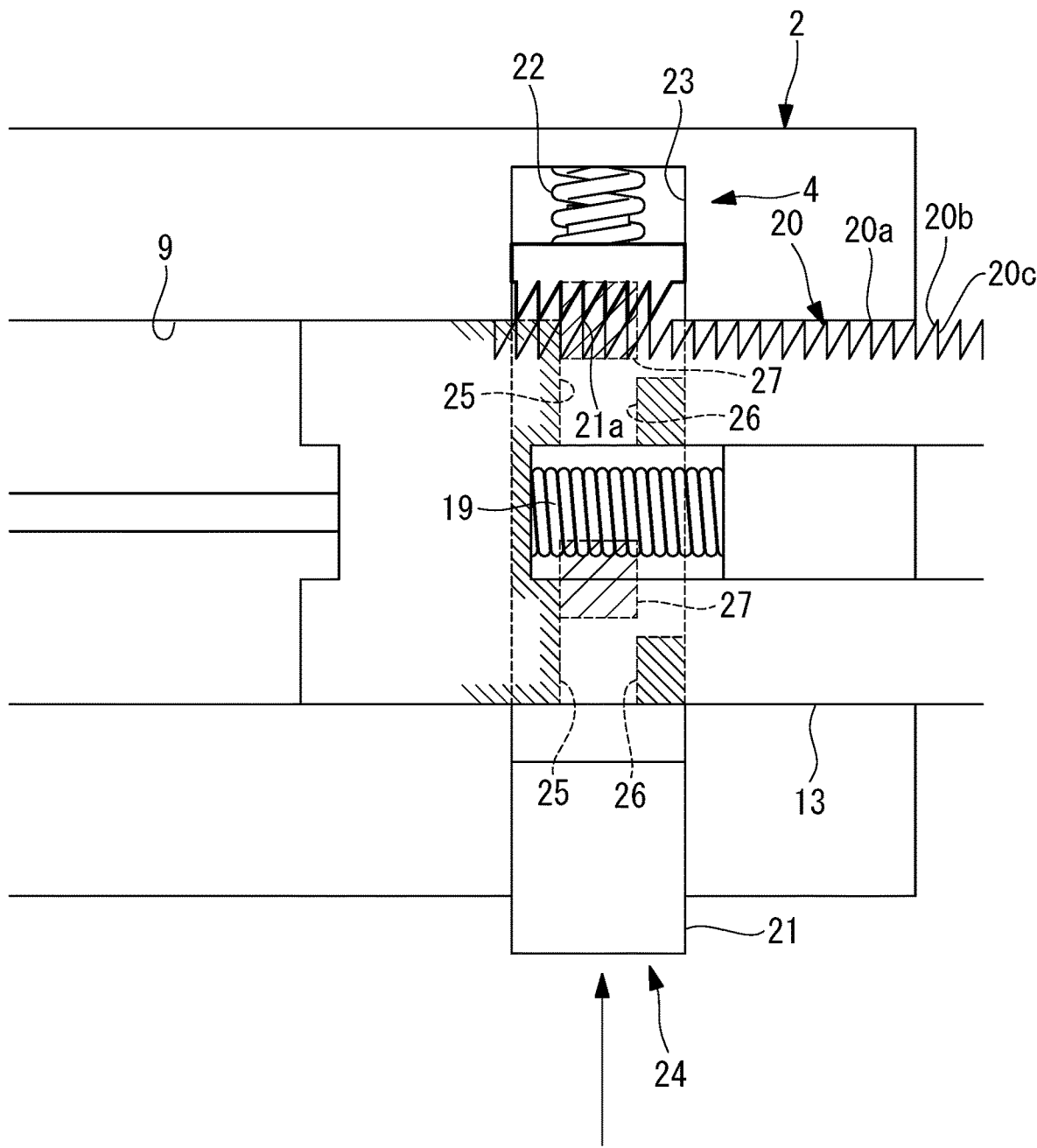
FIG. 12 is a partially enlarged view for explaining the operation of the projections in FIG. 11.

In the state shown in FIG. 11, the first projection 25 and the second projections 26 are arranged at positions separated from the third projections 27, and are not engaged with the third projections 27. From this state, when the engaging tooth member 21 is pushed in to release the engagement between the engaging tooth member 21 and the rack gear 20 and the slider 3 is pulled out from the device main body 2 to the maximum, as shown in FIG. 12, the first projection 25 of the slider 3 abuts against the third projections 27 of the engaging tooth member 21.

Figure 13:
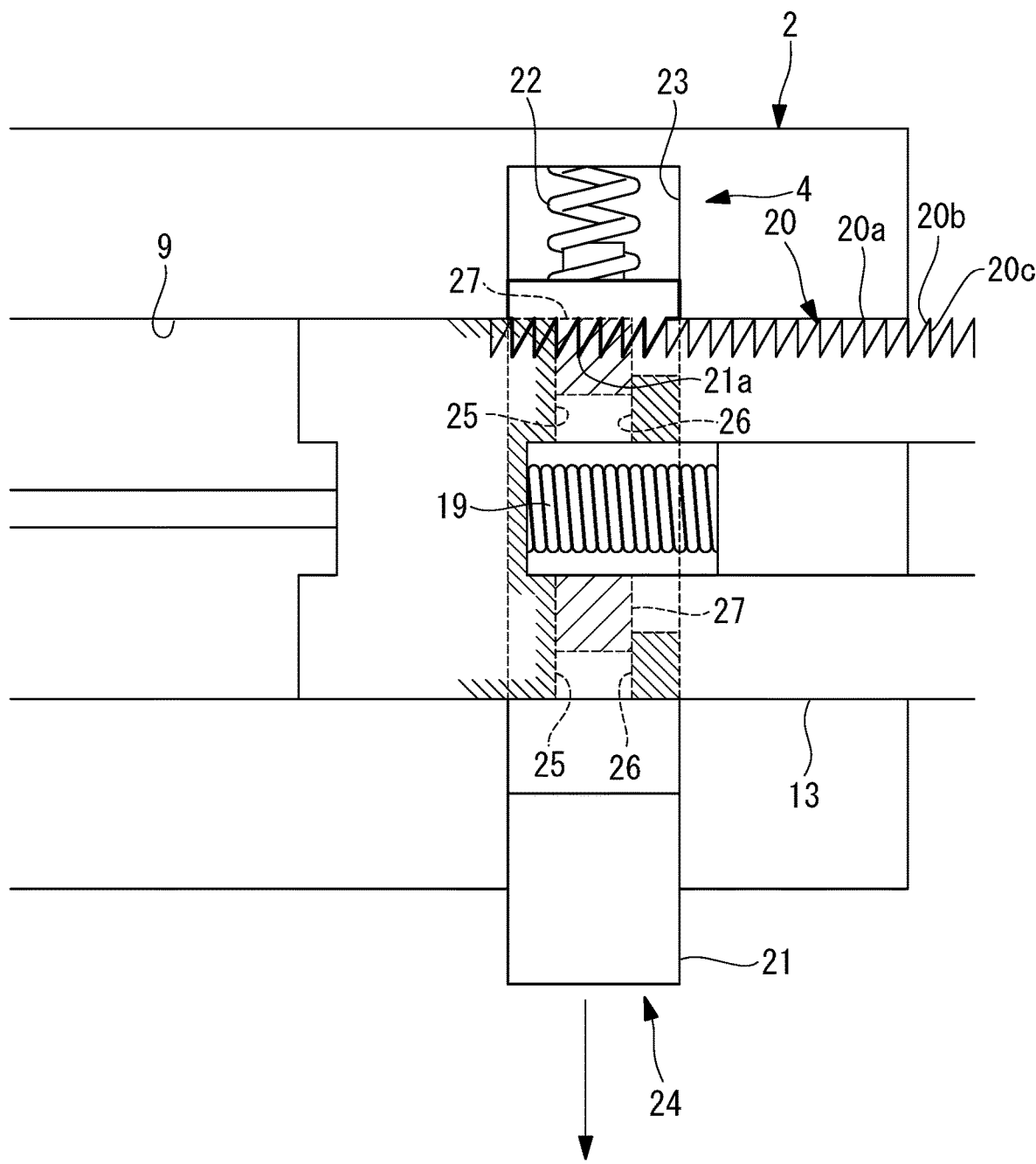
FIG. 13 is a partially enlarged view for explaining further operation of the projections in FIG. 11.
Figure 14:
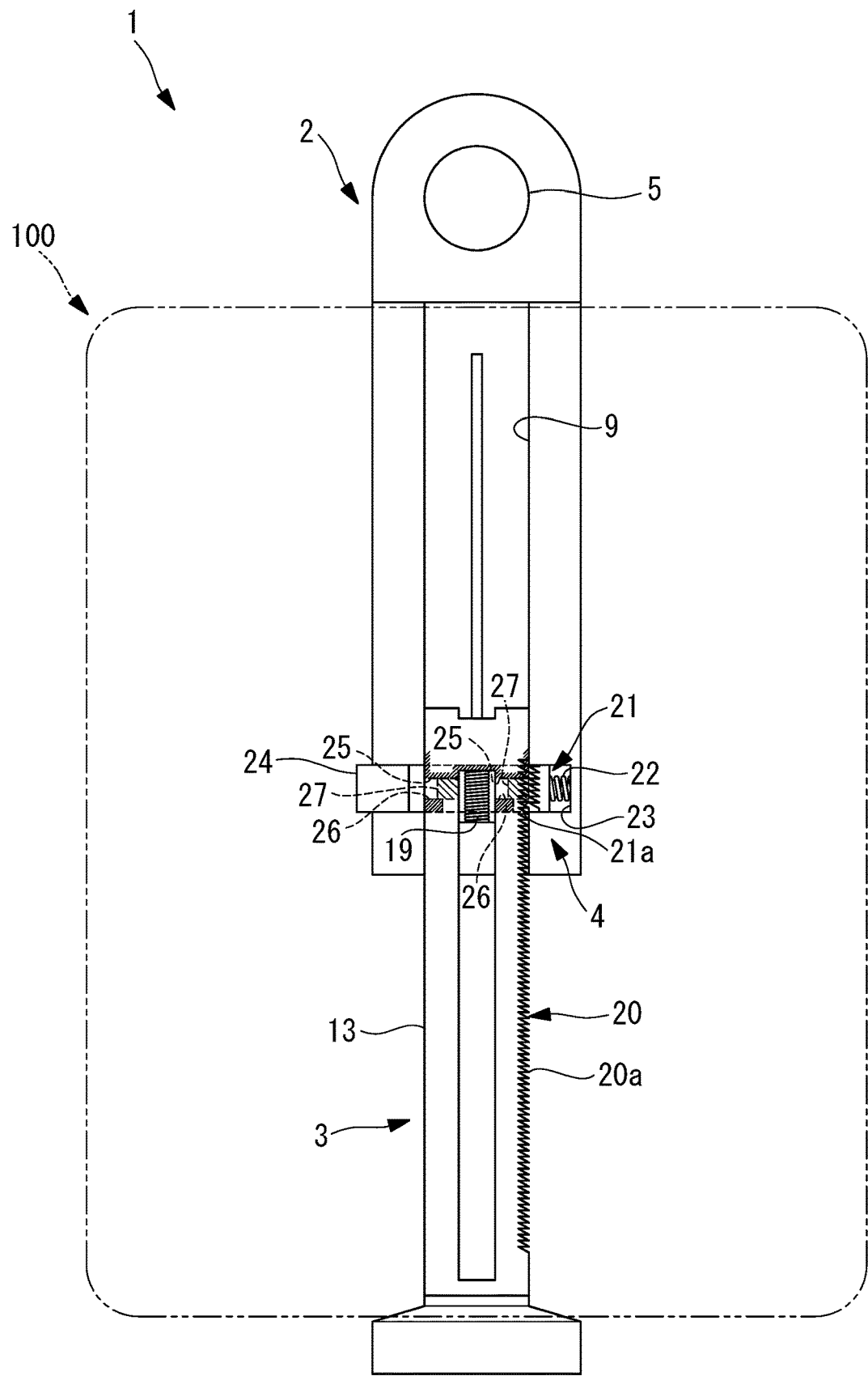
FIG. 14 is a front view showing the safety switch device in FIG. 11.

In this state, when the force that has been applied to the engaging tooth member 21 is released, the third projections 27 are inserted between the first projection 25 and the second projections 26, as shown in FIG. 13, and the movement of the slider 3 with respect to the device main body 2 is locked. In other words, the slider 3 is locked so as not to move at the position where the slider 3 is pulled out from the device main body 2 to the maximum; thus, as shown in FIG. 14, it is possible to maintain the distance between the first holding portion 10 and the second holding portion 14 in such a state that said distance is larger than the longitudinal dimension of the portable terminal 100.

Then, the portable terminal 100 is inserted into a maximally opened space between the first holding portion 10 and the second holding portion 14, an upper end edge of the portable terminal 100 is pressed against the first holding portion 10, and the engagement between the engaging tooth member 21 and the rack gear 20 is subsequently released. By doing so, the slider 3 moves by means of the resilient force of the coil spring 19, and the portable terminal 100 is held between the first holding portion 10 and the second holding portion 14.

As described above, providing a mechanism for locking the slider 3 can facilitate the attachment of the portable terminal 100 between the first holding portion 10 and the second holding portion 14. In other words, it is not necessary to apply a force to the slider 3 against the resilient force of the coil spring 19 and attach the portable terminal 100 while pushing and expanding a space between the first holding portion 10 and the second holding portion 14 such that the distance therebetween becomes larger than the longitudinal dimension of the portable terminal 100.

Figure 15:
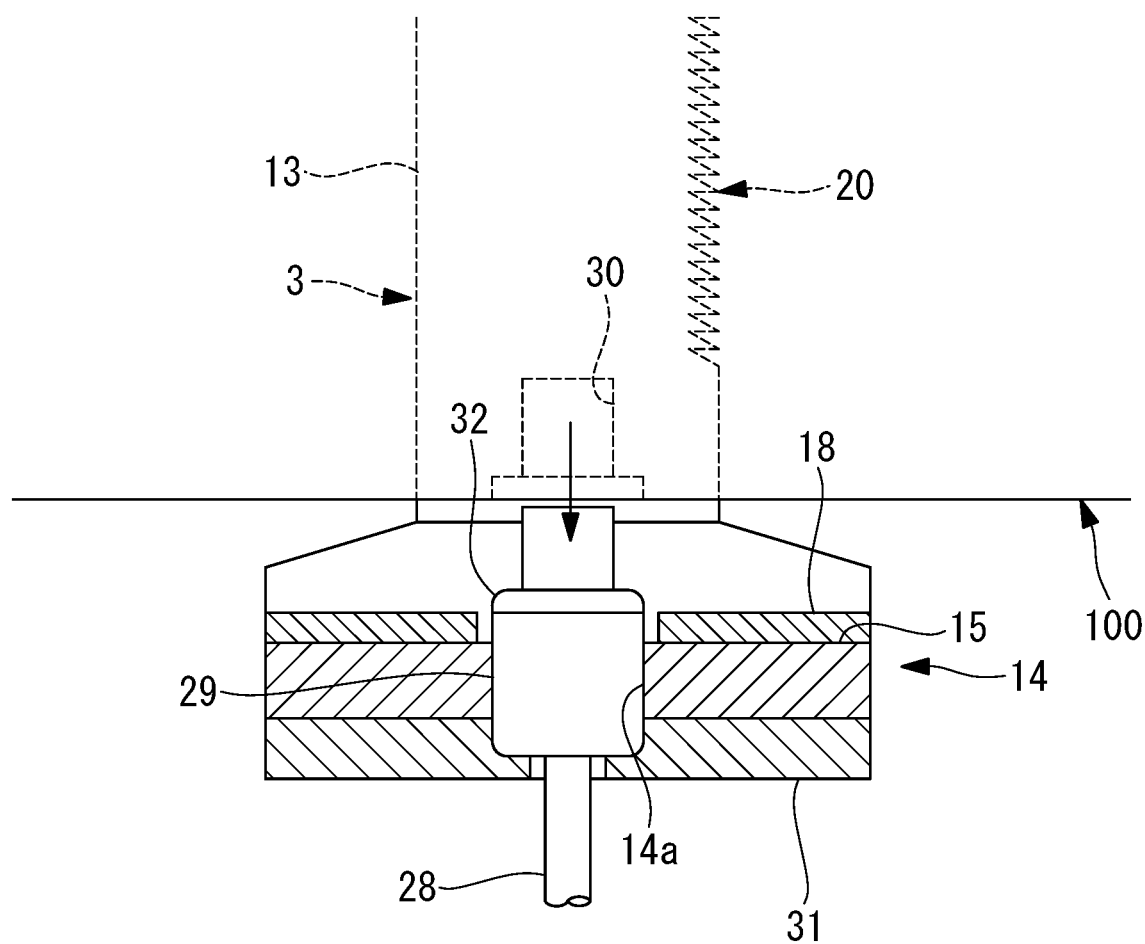
FIG. 15 is a partially enlarged view of the safety switch device in FIG. 11.

Furthermore, as a result of providing a mechanism for locking the slider 3 so as not to move at the position where the slider 3 is pulled out from the device main body 2 to the maximum, as shown in FIGS. 11 to 14, it is possible to facilitate connection of a cable 28 to the portable terminal 100, as shown in FIG. 15. The cable 28 may be either for a signal or for a power supply.

For example, as shown in FIG. 15, a receptacle 30 for connecting a connector 29 of the cable 28 to the portable terminal 100 is often disposed at the center in the width direction of an end edge of the portable terminal 100 in the longitudinal direction. Therefore, it is preferable that the connector 29 be disposed in the second holding portion 14.

In this case, when the slider 3 is locked at the position where the slider 3 is pulled out from the device main body 2 to the maximum and the portable terminal 100 is attached, the portable terminal 100 can be placed parallel to the moving direction of the slider 3. Therefore, there is an advantage in that it is possible to insert the connector 29 straight into the receptacle 30 of the portable terminal 100 merely by moving the slider 3, and to prevent the connector 29 and the receptacle 30 from being damaged due to obliquely inserting the connector 29.

In FIG. 15, the connector 29 is disposed in a hole 14a provided in the second holding portion 14, and the connector 29 is fixed to the second holding portion 14 by means of a detachable fixing member 31. Alternatively, the connector 29 may be embedded in the second holding portion 14 without using the fixing member 31.

In addition, as a result of the connector 29 being provided with a seal member 32 that is squashed between the connector 29 and the receptacle 30 in a state in which the connector 29 is coupled to the receptacle 30, it is possible to waterproof a contact portion between the connector 29 and the receptacle 30. Alternatively, a portion of the cushion 18 disposed on the abutting surface 15 may be utilized as a seal member.

In addition, although two each of the second projections 26 and the third projections 27 are provided in FIGS. 11 to 14, alternatively, one each of those may be provided.

In addition, in this embodiment, the slider 3 and the engaging tooth member 21 that moves with respect to the slider 3 are utilized to configure the lock mechanism constituted of the projections 25 to 27 provided in said components; however, alternatively, it is permissible to employ another lock mechanism capable of locking the movement of the slider 3 with respect to the device main body 2.

The invention claimed is:

1. A safety switch device, comprising:
a device main body;
a movable portion that is provided so as to be movable in a prescribed moving direction with respect to the device main body; and
a holding portion configured to hold the movable portion at a desired position in the moving direction with respect to the device main body, wherein
the device main body includes a main-body-side holding portion with which one side of a portable terminal is brought into contact,
the movable portion includes a movable-portion-side holding portion with which another side of the portable terminal is brought into contact,
the holding portion includes a rack gear that is provided in one of the device main body and the movable portion along the moving direction, an engaging tooth member that is provided in the other of the device main body and the movable portion and that is supported so as to be movable in a direction intersecting the moving direction, and a springy member that urges the engaging tooth member in a direction in which the engaging tooth member meshes with the rack gear, and the rack gear and the engaging tooth member, in a meshed state, are engaged with each other so that the movable-portion-side holding portion is movable, from a non-holding state to a holding state, in a direction in which a distance between the main-body-side holding portion and the movable-portion-side holding portion is narrowed and so that the movable-portion-side holding portion is not movable, in the holding state, in an opposite direction, wherein the non-holding state is a state in which the portable terminal is not sandwiched by the main-body-side holding portion and the movable-portion-side holding portion, and the holding state is a state in which the portable terminal is sandwiched by the main-body-side holding portion and the movable-portion-side holding portion, wherein the movable-portion-side holding portion is configured to hold a connector of a cable that is connected to the portable terminal in a connection direction along the moving direction of the movable portion, wherein the movable-portion-side holding portion is configured to insert the connector into the portable terminal when the movable-portion-side holding portion moves from the non-holding state to the holding state, and configured to hold the connector so that the movable-portion-side holding portion prevents the connector from moving, relative to the movable portion, to an opposite direction opposite from the connection direction.

2. The safety switch device according to claim 1, wherein the engaging tooth member has a plurality of teeth that mesh with a plurality of teeth of the rack gear at the same time.

3. The safety switch device according to claim 1, further comprising a release mechanism that causes the engaging tooth member to move in a direction in which the engaging tooth member is separated from the rack gear to release engagement between the engaging tooth member and the rack gear.

4. The safety switch device according to claim 3, wherein
the device main body is provided with a grip portion that is gripped by a hand of an operator,
the grip portion is provided with a deadman switch that can be set to be an ON state when the grip portion is gripped by the hand and that is set to be an OFF state when the grip portion is not gripped.

5. The safety switch device according to claim 1, wherein at least one of the main-body-side holding portion and the movable-portion-side holding portion is provided with an elastic body capable of being elastically deformed as a result of being pushed by the portable terminal.

6. The safety switch device according to claim 1, wherein
the rack gear is provided in the movable portion, and
the engaging tooth member is provided in the device main body.

7. The safety switch device according to claim 6, wherein the engaging tooth member is disposed in the vicinity of an end portion on a side close to the movable-portion-side holding portion.

8. The safety switch device according to claim 1, further comprising an urging member configured to urge the main-body-side holding portion and the movable-portion-side holding portion in an approaching direction.

9. The-A safety switch device comprising:
a device main body;
a movable portion that is provided so as to be movable in a prescribed moving direction with respect to the device main body; and
a holding portion configured to hold the movable portion at a desired position in the moving direction with respect to the device main body, wherein
the device main body includes a main-body-side holding portion with which one side of a portable terminal is brought into contact,
the movable portion includes a movable-portion-side holding portion with which an other side of the portable terminal is brought into contact,
the holding portion includes a rack gear that is provided in one of the device main body and the movable portion along the moving direction, an engaging tooth member that is provided in the other of the device main body and the movable portion and that is supported so as to be movable in a direction intersecting the moving direction, and an springy member that urges the engaging tooth member in a direction in which the engaging tooth member meshes with the rack gear, and
the rack gear and the engaging tooth member, in a meshed state, are engaged with each other so that the movable-portion-side holding portion is movable, from a non-holding state to a holding state, in a direction in which a distance between the main-body-side holding portion and the movable-portion-side holding portion is narrowed and so that the movable-portion-side holding portion is not movable, in the holding state, in an opposite direction, wherein the non-holding state is a state in which the portable terminal is not sandwiched by the main-body-side holding portion and the movable-portion-side holding portion, and the holding state is a state in which the portable terminal is sandwiched by the main-body-side holding portion and the movable-portion-side holding portion,
wherein the safety switch device further comprises a lock mechanism capable of locking, in the non-holding state, the movable portion with respect to the device main body in a state in which the movable-portion-side holding portion of the movable portion is prevented from moving toward the main-body-side holding portion.

* * * * *